E. A. WARREN.

Assignor of half interest to T. J. MOORE.

Printer's Quoin.

No. 8,210. Reissued May 7, 1878.

Witnesses.
John Becker
Jno. T. Haynes

Inventor
Edmond A. Warren
by his Attorneys
Brown & Allen

N. PETERS, PHOTO-LITHOGRAPHER, WASHINGTON, D. C.

UNITED STATES PATENT OFFICE.

EDMOND A. WARREN, OF BROOKLYN, NEW YORK, ASSIGNOR OF ONE-HALF INTEREST TO THOMAS J. MOORE, OF SAME PLACE.

IMPROVEMENT IN PRINTERS' QUOINS.

Specification forming part of Letters Patent No. 151,455, dated May 26, 1874; Reissue No. 8,210, dated May 7, 1878; application filed April 27, 1878.

*To all whom it may concern:*

Be it known that I, EDMOND A. WARREN, of the city of Brooklyn, in the county of Kings and State of New York, have invented an Improvement in Printers' Quoins, of which the following is a description, reference being had to the accompanying drawing, forming part of this specification.

This invention consists in a combination of two quoins arranged in face-to-face contact with each other, and a pinion-key, which gears the said quoins together, whereby the said quoins may be used in any ordinary chase with furniture of ordinary construction.

Figure 1:
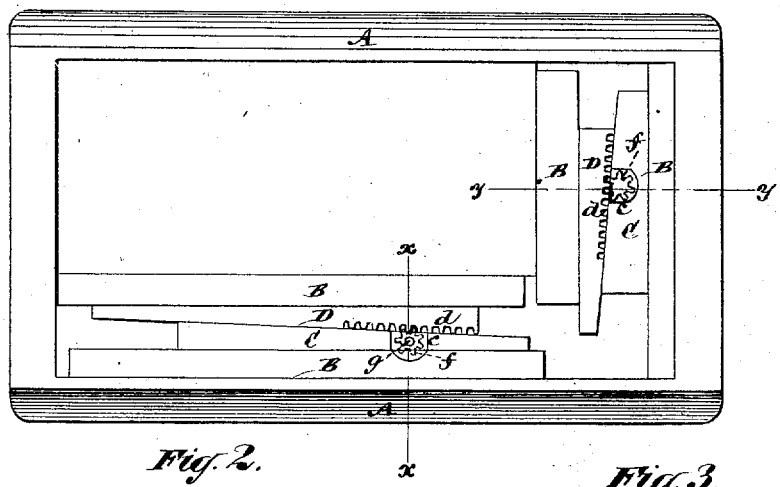
Figure 2:
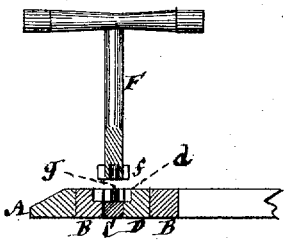
Figure 3:
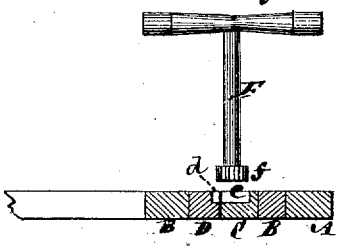

In the accompanying drawing, Figure 1 is a top view of a chase and furniture with my invention applied. Fig. 2 is a vertical section taken on the line *x x* of Fig. 1. Fig. 3 is a vertical section taken on the line *y y* of Fig. 1.

The chase A and furniture B may be of the ordinary form and construction, and each pair of quoins C D of suitable wedge shape, with their adjacent faces in contact. The quoin C is represented as provided with a recess, *c*, in its upper face, to form a bearing for a toothed wrench or pinion-key, F *f*. The other quoin, D, is represented as formed with a rack, *d*, or series of teeth, on its inclined face, for engagement with the pinion *f* of the key when said pinion, by the insertion of the key, is within the recess *c*, which recess is opposite the rack *d*, and suitably constructed to allow the teeth of the pinion to mesh into the rack.

If desired, the recess *c* may have in its center a pivot, *g*, for engagement with a socket in the lower end of the key, as shown in Fig. 2.

A piece of ordinary furniture, B, is represented as arranged between the quoin D and the type, and a similar piece of furniture may be arranged between the quoin C and the chase. Thus it will be seen that the pinion-key engages with both of the quoins C D, gearing them together, and according to the direction in which it is turned will said quoins be tightened or loosened, the two quoins, when both move, working in reverse directions. Such a combination of the key with two quoins involves no special construction of the chase or of the furniture, as is required in all previous constructions and arrangements of geared quoins.

I claim—

The combination of the two quoins arranged in face-to-face contact with each other, and a pinion-key, which gears the said quoins together, substantially as and for the purposes herein set forth.

EDMOND A. WARREN.

Witnesses:

JOSEPH P. MOORE,
WILLIAM PARKER.